United States Patent
Ogura et al.

[11] Patent Number: 5,123,093
[45] Date of Patent: Jun. 16, 1992

[54] OPERATIONAL PROCESSOR FOR PERFORMING A MEMORY ACCESS AND AN OPERATIONAL PROCESS IN PARALLEL

[75] Inventors: Toshihiko Ogura, Ebina; Kazumi Kubota, Tokyo; Hiromichi Enomoto, Hadano; Yoshihiro Fujikami, Yokohama, all of Japan

[73] Assignee: Hitachi, Ltd., Tokyo, Japan

[21] Appl. No.: 497,726

[22] Filed: Mar. 19, 1990

Related U.S. Application Data

[63] Continuation of Ser. No. 140,790, Jan. 5, 1988, abandoned.

Foreign Application Priority Data

Jan. 16, 1987 [JP] Japan .................. 62-5941

[51] Int. Cl.⁵ .................. G06F 9/38; G06F 9/28
[52] U.S. Cl. .................. 395/375; 395/800; 364/DIG. 1; 364/231.8; 364/281.4; 364/231.9
[58] Field of Search ... 364/200 MS File, 900 MS File

[56] References Cited

U.S. PATENT DOCUMENTS

| | | | |
|---|---|---|---|
| 3,775,756 | 11/1973 | Balser | 364/200 |
| 4,298,933 | 11/1981 | Shimokawa et al. | 364/200 |
| 4,481,580 | 11/1984 | Martin et al. | 364/200 |
| 4,503,496 | 3/1985 | Holzner et al. | 364/200 |
| 4,594,660 | 6/1986 | Guenthner et al. | 364/200 |
| 4,819,151 | 4/1989 | May | 364/200 |
| 4,901,224 | 2/1990 | Ewert | 364/200 |

*Primary Examiner*—Michael R. Fleming
*Assistant Examiner*—Gopal C. Ray
*Attorney, Agent, or Firm*—Antonelli, Terry, Stout & Kraus

[57] ABSTRACT

An operational processor comprising a data memory for storing data therein, at least one input data storage register for storing the data from the data memory, an arithmetic and logic unit (ALU) for computing the data, and a memory data storage register interposed between the input data storage register and the data memory so as to temporarily store the data from the data memory. An instruction from a host computer or the like is stored temporarily in an instruction register. A control circuit serves to control each register and the ALU in response to the instruction temporarily stored in the instruction register. The instruction partially has a field to indicate transfer of the data from the memory data storage register to the input data storage register. The instruction further has, in its partial division, a field to indicate one input data storage register to which the data is to be transferred.

18 Claims, 7 Drawing Sheets

```
READ    (R0) , R1
ADD     R2   , R0
READ    (R0) , R3
ADD     R2   , R0
AND     R1   , R4
AND     R3   , R4
```

```
READ    (R0)  , IDR1
ADD     R2    , R0
FREAD   (R0)  , IDR2
ADD     R2    , R0
FAND    IDR1  , R4
AND     IDR2  , R4
```

OPERATIONAL PROCESSOR FOR PERFORMING A MEMORY ACCESS AND AN OPERATIONAL PROCESS IN PARALLEL

This application is a continuation of application Ser. No. 140,790, filed Jan. 5, 1988, abandoned on Jul. 5, 1990.

BACKGROUND OF THE INVENTION

The present invention relates to a digital operational processor and, more particularly, to an apparatus adapted for operational processing of data with multiple memory accesses such as draw operation in a bit-mapped display.

The draw operation in a bit-mapped display basically includes data computation, which is termed "raster operation", between rectangular areas on a bit-mapped memory. Such raster operation can be realized by programming the procedure shown in a flow chart of FIG. 4A. In this flow chart, Dest. Data is an abbreviation for destination data. The number, of times of repeating the procedure shown in the flow chart is proportional to the dimensions of the rectangular area and reaches, for example, a value on the order of $10^5$ to $10^6$. In five instructions for each procedure of the repeated steps, there are included three memory access instructions, and the time required for the raster operation is determined by the memory access time.

In an attempt to increase the raster operation speed, each procedure of repeated steps is rendered executable with three instructions as shown in FIG. 4B by realizing a read-modify-write step through hardwaring the raster operation. In this procedure, the decision instruction (Loop End ?) for repetition is not related to the memory access. Therefore, when the memory write access and the decision instruction for repetition are executed in parallel, the decision instruction is included in the memory access time if the memory access is slower than the execution of the instruction. As the result, the processing time in the flow chart is determined merely by the memory access time alone while the time required for execution of the decision instruction is negligible, hence accomplishing a higher speed in the raster operation.

For achieving parallel execution of the memory write access and the operational process, there may be proposed a method by which the write address and the write data are latched in registers, and the processor executes the next instruction without waiting for completion of the write access. An exemplary system utilizing such idea is Am 29116 manufactured by Advanced Micro Devices Corporation.

Although the above-mentioned prior art successfully realizes a parallel execution of the data operation in the memory write mode, proper consideration is not given to a parallel execution in the memory read mode, and consequently there has been a problem heretofore with regard to speeding up more complicated data processing.

SUMMARY OF THE INVENTION

It is an object of the present invention to provide an improved operational processor which is capable of achieving a high-speed draw operation in a bit-mapped display.

Another object of the invention resides in providing a high-speed operational processor capable of performing a parallel data operation in a memory read mode.

In order to accomplish the objects mentioned, the present invention is equipped with means for controlling the read data input timing by a program at the memory read access so as to individually determine the timing of the read data input from the memory and the timing of the read data input from the program independently of each other, thereby enabling parallel execution of the memory access and the operational process in a read mode as well.

In the present invention, at least one input data storage register is provided and, after a register for data input is designated in the memory read access mode, the process for inputting data to such designated register and another data operational process are executed in parallel. The register for data input is designated in the read request mode and, after termination of the input, the content of such register is selectable as an operand, so that the memory access is started in response to the read request, but the processor is not placed in a wait state and executes the next instruction. Since the input data can be computed after completion of the memory access, the desired operation can be executed during the memory access by substituting the memory data compute instruction for the instruction unrelated thereto, whereby a higher speed is attained in the process correspondingly to elimination of the wait state.

In other words, when controlling the timing of the read data input from the program in the present invention after request of the memory read access by the program, if the data has already been inputted from the memory, such data is used for the control, whereas if the data has not yet been inputted from the memory, the processor is placed in a wait state and, upon completion of the data input from the memory, resumes the operation by the use of such data.

Thus, according to the operational processor of the present invention, parallel execution of the memory read access and the operational process can be realized by positioning the read-data nonrequiring instruction before the read-data requiring instruction after the read access request. Furthermore, even when the memory access is slow, it becomes possible to receive proper data by enabling the read-data requiring instruction to perform control of the read data input timing.

DETAILED DESCRIPTION OF THE PREFERRED EMBODIMENTS

Figure 1:
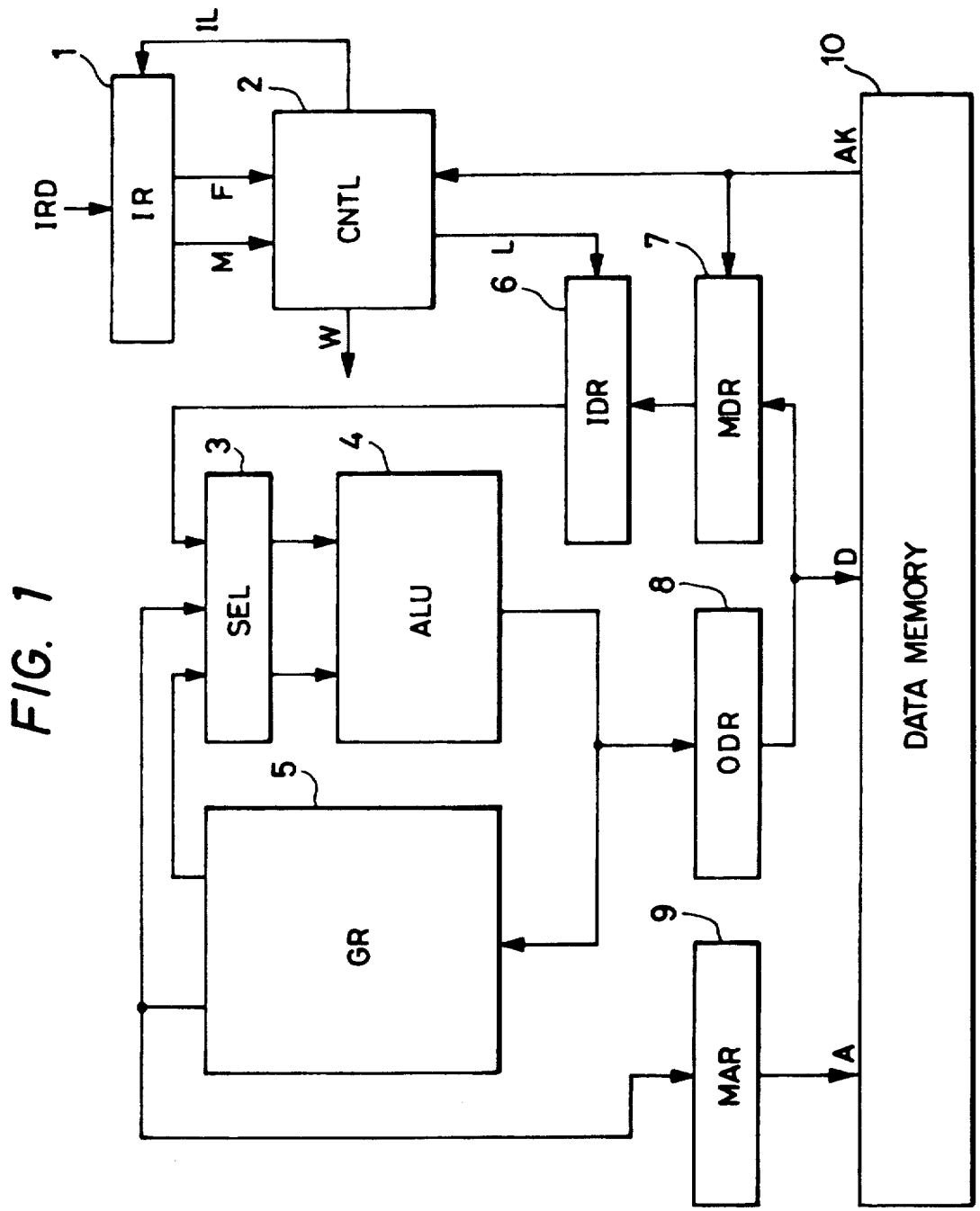
FIG. 1 is a block diagram of a first embodiment representing the operational processor of the present invention.

Hereinafter a preferred embodiment of the operational processor according to the present invention will be described with reference to FIGS. 1 through 3. FIG. 1 is a block diagram of principal components constituting this embodiment. In the diagram, there are shown an instruction register (hereinafter referred to as IR) 1 serving as an instruction interface means; a controller (CNTL) 2; an operand data selector (SEL) 3; an arithmetic and logic unit (ALU) 4; a general register (GR) 5; an input data register (IDR) 6; a memory data register (MDR) 7 serving as a memory interface means; an output data register (ODR) 8; and a memory address register (MAR) 9. Also shown in this diagram are a memory read signal M, a fetch signal F, a wait signal W, a data latch signal L to the IDR 6, a memory address signal A, a memory data signal D, a memory acknowledge signal AK, a load signal IL (IL = $\overline{W}$·CLK) to the IR 1, and data IRD to the IR 1. There is shown in FIG. 1 a display data memory 10 such as a bit-mapped memory for transferring the memory data signal D, however, a host computer for outputting the data IRD is not shown.

Figure 2:
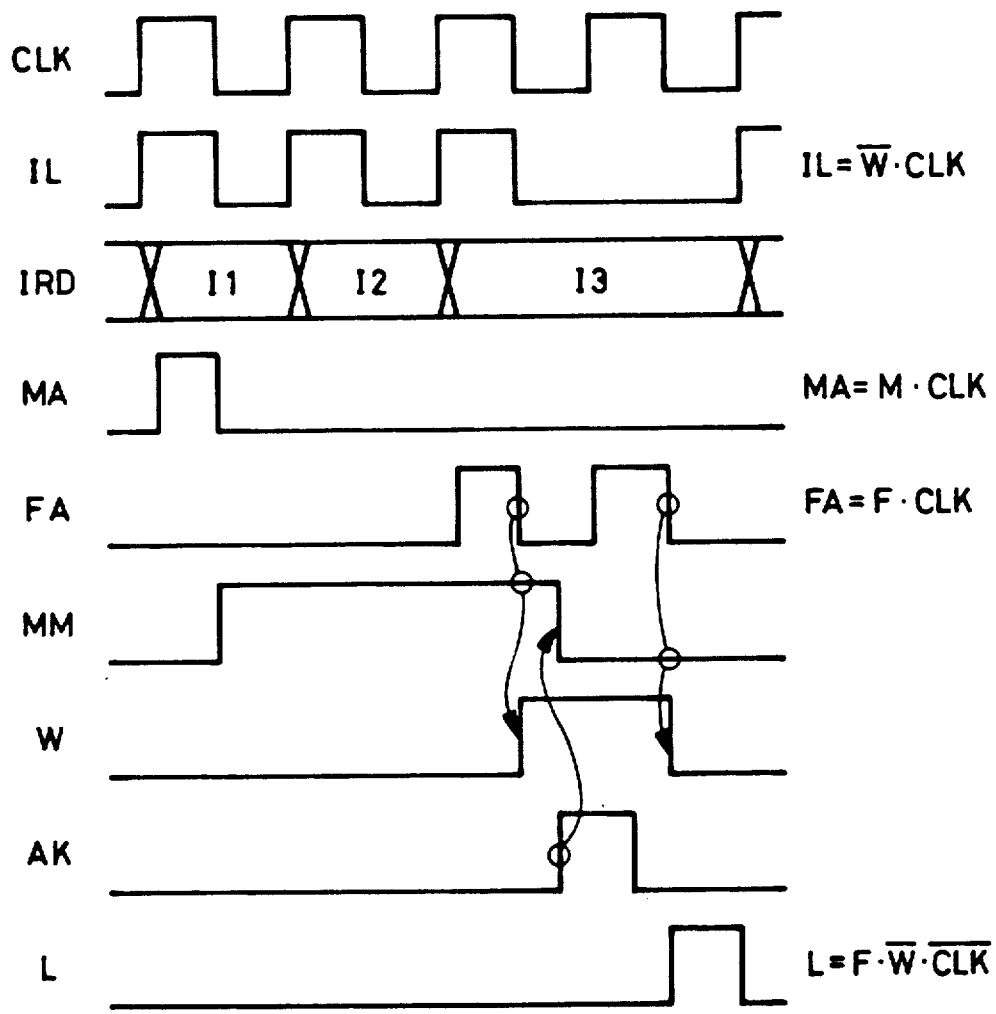
FIG. 2 is a waveform chart showing the action timing in the first embodiment of FIG. 1.
Figure 3:
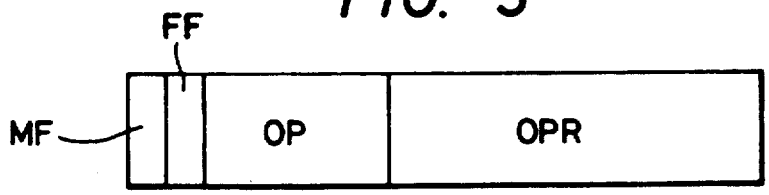
FIG. 3 is a schematic diagram showing an exemplary instruction format used in the first embodiment.
Figure 4A:
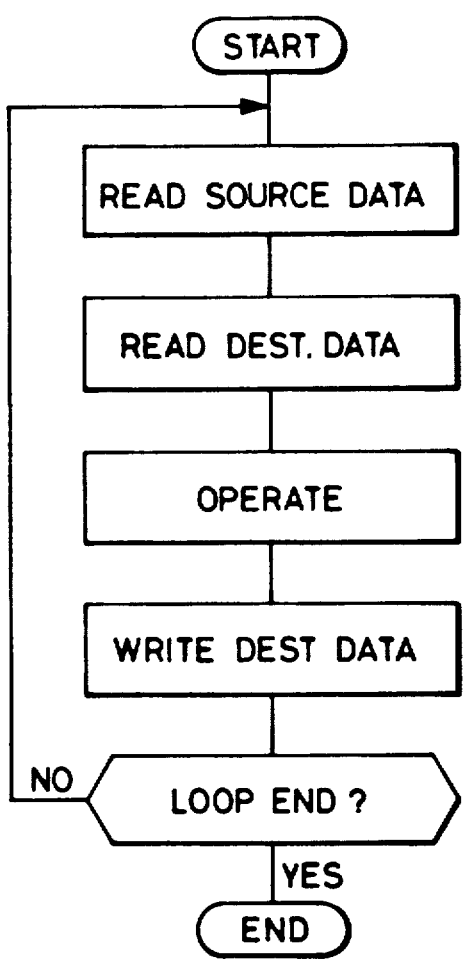
FIGS. 4A and 4B are conventional flow charts for realizing a raster operation under program control.
Figure 4B:
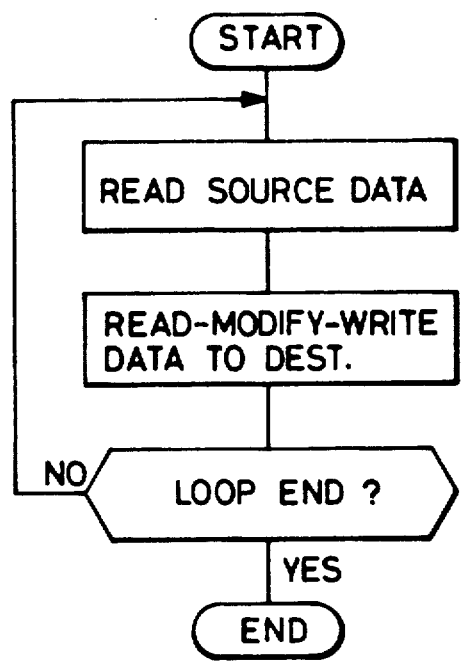

FIG. 2 is a waveform chart showing the action timing in the CNTL 2 of FIG. 1. The detailed circuit configuration of the CNTL 2 will be described later. This waveform chart includes a clock signal CLK for the processor; a signal MA indicating that the data IRD is a memory access instruction (MA = M·CLK); a signal FA indicating that the data IRD is a fetch instruction (FA = F·CLK); and a memory access signal MM indicating the duration of the memory access. FIG. 3 shows an exemplary instruction format employed in the operational processor of FIG. 1. In FIG. 3, there are included a field MF corresponding to the signal M indicative of a memory access instruction; a field FF corresponding to the fetch signal F; an operational field OP; and an operand data field OPR.

The action performed in the processor of FIG. 1 will now be described below with reference to FIGS. 2 and 3. In an inter-register operation, the data from the GR 5 is computed in the ALU 4 via the SEL 3 and then is stored in the GR 5. The SEL 3 is so formed as to select two of the data obtained from three input terminals. In the memory write mode, the address data from the GR 5 is outputted via the MAR 9 to an address bus. Meanwhile the write data from the GR 5 is transferred via the SEL 3 and the ALU 4, and then is outputted via the ODR 8 to the data bus. In the operational processor of the present invention, the memory write is terminated at the end of storing the data in the MAR 9 and the ODR 8, and subsequently the procedure advances to execution of the next instruction before completion of the actual memory write access.

The memory read is separated into a memory read request and a read data input. In response to the memory read request, the address data from the GR 5 is outputted via the MAR 9 to the address bus. The memory read request is terminated at the end of storing the address data in the MAR 9. The read data input is executed by setting the field FF to 1 in the instruction format of FIG. 3. Since any field other than the field FF is not involved, every instruction can be executed with the exception that the field FF is 0.

Now the action of inputting the read data will be described below with reference to FIG. 2. It is supposed here that the instruction data I1 of IRD is a memory read request, I2 is an instruction other than the memory access, and I3 is an instruction when the field FF is 1. First the instruction data I1 is inputted to the IR 1 by the instruction register load signal IL, so that the memory read is started. The instruction I2 loaded by the next clock CLK is normally executed since it is not the memory access, and then the instruction I3 is loaded by the next clock CLK. As the instruction I3 has the field FF as 1, the wait signal W is turned to 1 by the memory access signal MM. Upon turning of the wait signal W to 1, the load signal IL is inhibited and consequently renewal of the instruction address is also inhibited, so that the operational processor is placed in a wait state.

In response to input of the signal AK indicating completion of the memory read, the memory access signal MM is turned to 0 and the read data is stored in the MDR 7. Subsequently, since the memory access signal MM is 0, the wait signal W is turned to 0 again by the next clock CLK and then the data latch signal L (= F·$\overline{W}$·CLK) is outputted, whereby the output of the MDR 7 corresponding to the memory read data is stored in the IDR 6 to complete the read data input. As the wait signal W is returned to 0, the next instruction is loaded by the next clock in the instruction register and is executed sequentially.

In the waveform chart of FIG. 2 showing the action timing in the CNTL 2 where a wait state is caused with the field FF set to 1, it is obvious that if the memory access is fast, the wait state is not effected because the wait signal W is 0. Furthermore, due to storage of the read data in the IDR 6 at the end of the instruction I3, when the instructions I2 and I3 refer to the content of the IDR 6, it follows that such reference is made with regard to the memory data before execution of the read request by the instruction I1. Thus, whether the content of the IDR 6 is the preceding read access data or the current one can be determined merely by the program control of the field FF without depending on the memory access time.

In this embodiment, as described above, the memory access and the operational process can be performed in parallel easily by the program. Moreover, since the reading is terminated before actual operation of the read data, correction required upon occurrence of any error in the read data can be performed with ease. Although in the above embodiment the field FF is formed for all the instructions, it is manifest that the same effect is achievable by limiting such field to a specific instruction alone or by adopting another system which executes control in accordance with the result of decoding a plurality of fields. In addition, differing from the above embodiment where a single IDR 6 is provided, the same effect is obtainable by the use of a plurality of such registers or by employing a general register GR for substitution.

Figure 5:
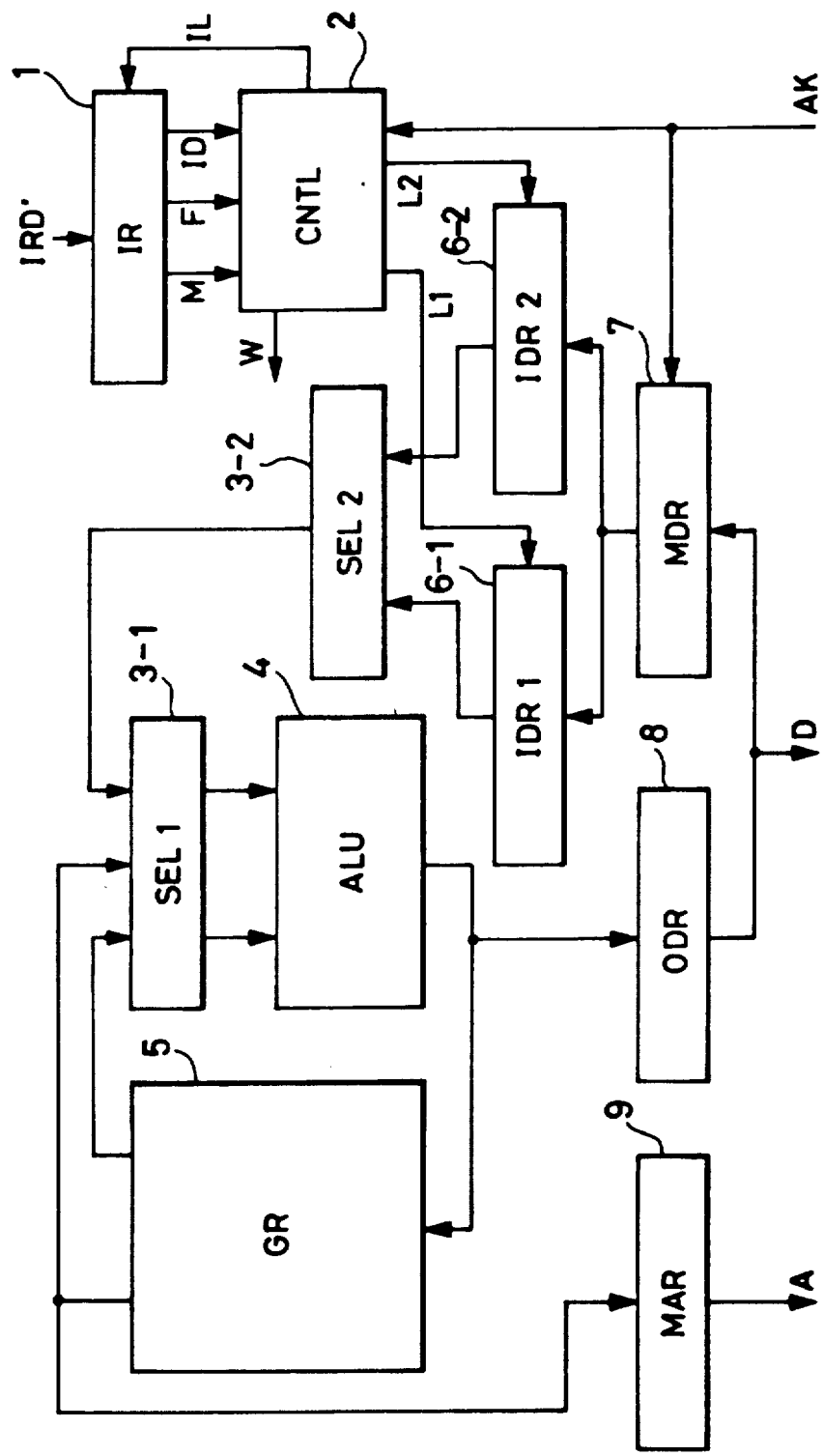
FIG. 5 is a block diagram of a second embodiment representing the operational processor of the present invention.

Now, with reference to FIGS. 5 through 8, a description will be given on another exemplary operational processor as a second embodiment of the present invention which is equipped with a plurality of input data registers (IDRs). FIG. 5 is a block diagram of such operational processor. In this diagram are included second input data storage registers (IDRs) 6-1 and 6-2, and data selectors (SELs) 3-1 and 3-2. Other components are the same as those used in the first embodiment of FIG. 1. ID denotes an input register indicating signal; L1 and L2 denote latch signals to the first and second IDRs 6-1 and 6-2 respectively, and IRD' represents instruction data. Other signals are the same as those in the first embodiment.

Figure 6:
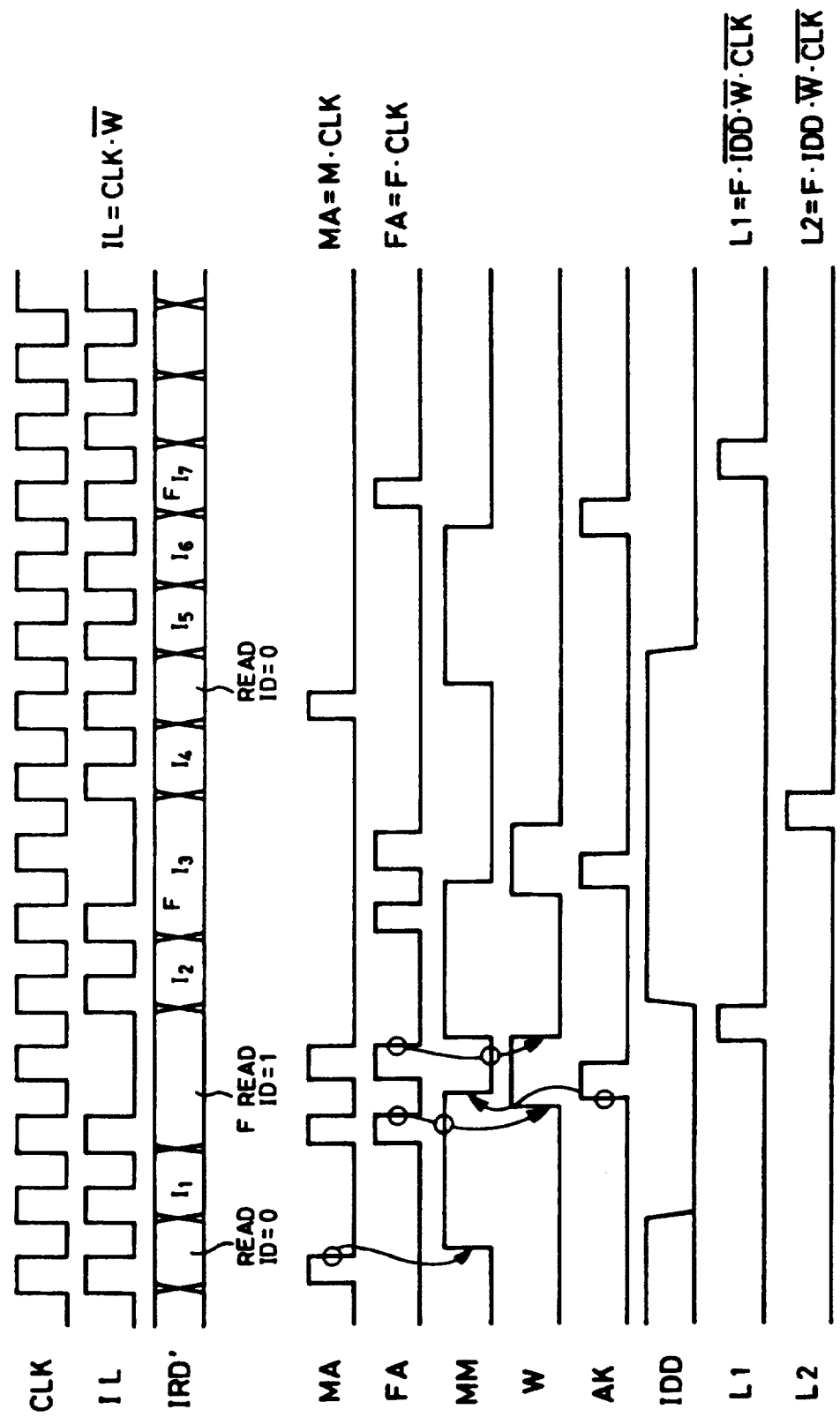
FIG. 6 is a waveform chart showing the action timing in the second embodiment of FIG. 5.
Figures 7, 8A, 8B:
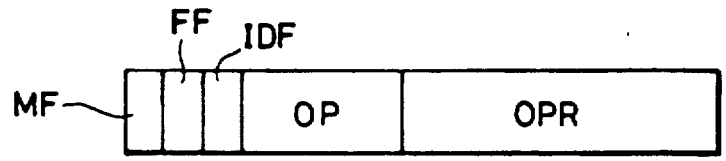
FIG. 7 is a schematic diagram showing an exemplary instruction format used in the second embodiment.
FIGS. 8A and 8B show exemplary descriptions of programs employed in the present invention.

FIG. 6 is a waveform chart showing timing of the CNTL 2. In this chart, IDD denotes a latched signal, while others are the same as those illustrated in FIG. 2. FIG. 7 shows an instruction format employed in the operational processor according to the second embodiment, wherein IDF denotes a field for an input register indicating signal inherent in this embodiment.

Hereinafter a description will be given on the operation of the operational processor of this embodiment. When the instruction in the processor is for execution of an inter-register operation, the data from the GR 5 is fed via the first SEL 3-1, while the data from the first IDR-6-1 or the second IDR 6-2 is fed via the second SEL 3-2 and the first SEL 3-1, and the data computed in the ALU 4 is then stored in the GR 5. When the instruction is for memory write access, the address data from the GR 5 is latched in the MAR 9, while the write data from the GR 5 is fed via the ALU 4 and is latched in the ODR 8, so that the memory access is started. Since the data required for the memory write is thus latched and held, the operational processor starts execution of the next instruction without waiting for completion of the write access.

In case the instruction is for memory read access, the operational processor merely indicates start of executing the read access. That is, the address data from the GR 5 is latched in the MAR 9 and, after designation of the input data register by the ID signal, the memory read access is started. After indicating the start of the access, the operational processor indicates execution of the next instruction without being placed in a wait state. Inputting the memory read data is executed by setting the field FF to 1 in the processor.

In the waveform chart of FIG. 6 showing the operational timing, IRD' denotes instruction data for the operational processor, of which merely the read access and fetch portions are required, and other instructions are represented by Il, I2 and so forth. First the memory read signal MA (=M·CLK) is turned to 1 by the read instruction, and the memory access signal MM is turned to 1 synchronously with the fall of the signal MA. Then the memory read access is started to latch the value of the ID field stored together with the read instructions as shown in FIG. 7. The ID signal designates the IDR 6-1 when being 0 or designates the IDR 6-2 when being 1.

The operational processor executes the next instruction Il at the timing shown in FIG. 6 and then the read instruction. At the time of executing the read instruction, the acknowledge signal AK from the memory has not arrived yet, so that the processor is placed in a wait state. The signal W indicating such wait state is produced by latching the memory access signal MM with the fetch signal FA (=F·CLK). Upon input of the acknowledge signal AK, the read data is latched in the MDR 7 to release the processor from the wait state, whereby the memory access is started. The latch signal L1 to the IDR 6-1 is outputted at the end of this instruction, so that the memory data latched in the MDR 7 is inputted. In this instruction where the signal ID is 1, the signal IDD also becomes 1.

Since the instruction I3 is not for memory access but for fetch with the fetching signal F being 1, the latch signal L2 to the IDR 6-2 is outputted. In the instruction I3, the processor is placed in a wait state due to duration of the memory access (MM =1) as in the preceding read instruction. However, in execution of the instruction I7 which is a similar fetch instruction, no wait state is caused because of completion of the access. It is obvious from FIG. 6 that the latch signals L1 and L2 to the IDRs 6-1 and 6-2 are not indicated by the fetch instruction I3 or I7 but are determined by the signal IDD which is set by the read instruction ID executed previously.

In this embodiment, as described hereinabove, the IDR for data input is indicated in response to the memory read request, and indication of the fetch alone is needed at the time of data input. Consequently it is unnecessary to use the data field OPR for indication of the IDR, whereby normal operation is rendered possible by the fetch instruction as well, hence eliminating the necessity of using the fetch instruction as an exclusive instruction. Thus, parallel execution of the memory access and the operational process can be realized by the same instructions as those employed in the ordinary processor to eventually achieve a higher processing speed. Furthermore, the same programming as in the ordinary operational processor is rendered possible merely by indicating the fetch before the instruction for operation of the memory read data, hence avoiding the problem that may otherwise be raised by parallel execution of the memory access and the operational process.

FIGS. 8A and 8B show exemplary descriptions of programs, in which FIG. 8A is an example in an ordinary processor, and FIG. 8B is an example in this embodiment where(R0) signifies that address data is outputted from a register R0. FIGS. 8A and 8B are mutually equal with the exception that the names of registers are partially replaced with those of read data storage registers as IDR1 and IDR2, and also that F for indicating a fetch is added to some of instructions. Thus, parallel execution of the memory access can be realized with substantially the same description of instructions to eventually facilitate achievement of a higher-speed processing. Although in this embodiment the input data storage register is provided separately, a similar effect is also attainable by employing in the general register a means which stores both the result of operation and the memory data in response to a single instruction, and substituting the general register for the input data storage register.

Figure 9:
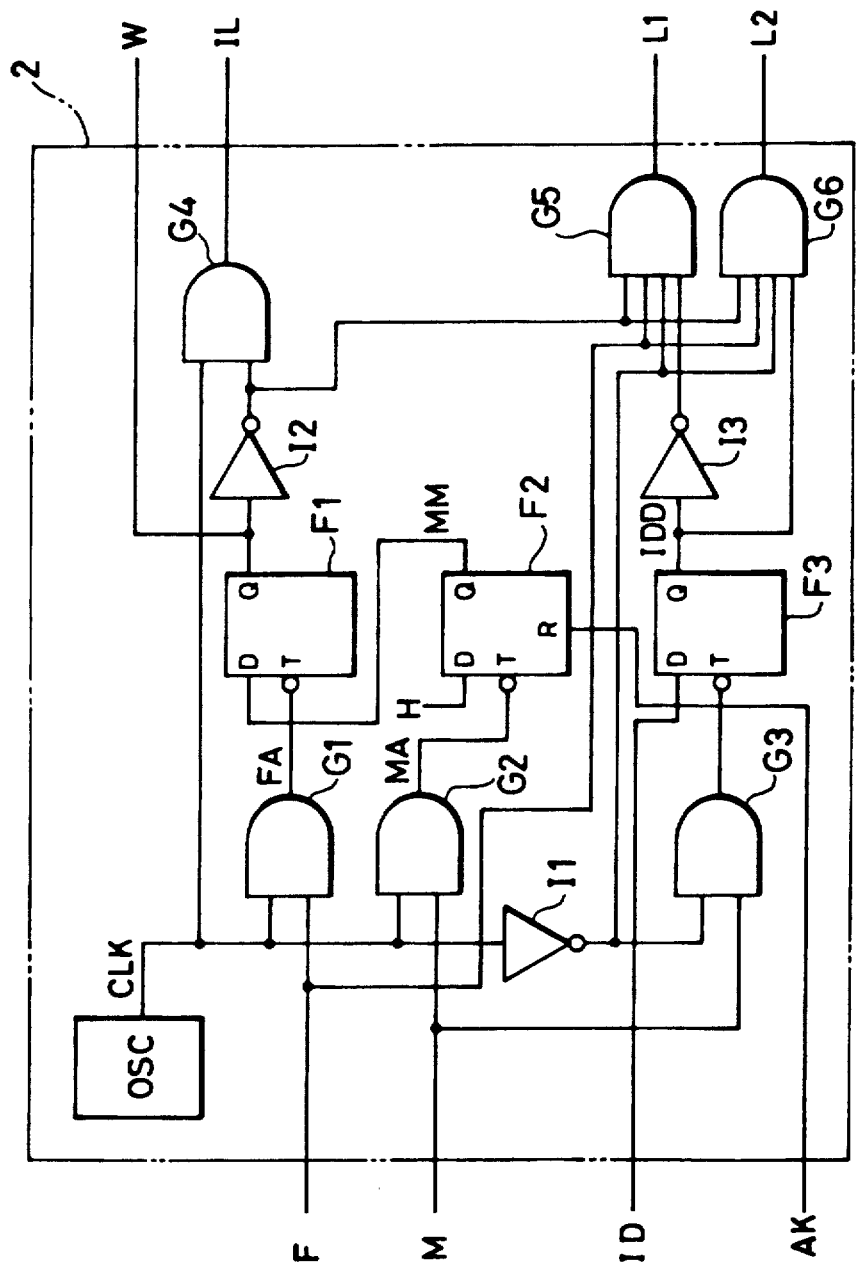
FIG. 9 shows a specific circuit configuration of a control circuit in the second embodiment of FIG. 5.

FIG. 9 is a specific circuit diagram of the CNTL 2 in the second embodiment of FIG. 5. Since the circuit configuration of the aforementioned CNTL 2 in the first embodiment of FIG. 1 is clear from the configuration shown in FIG. 9, a repeated explanation is omitted. In FIG. 9, there are shown AND gates G1 - G6, inverters I1 - I3, flip-flops F1 - F3, and a clock oscillator OSC for the processor. The gates G1, G2 and the flip-flops F1, F2 produce signals MA, FA, MM and W; the gates G3, G5, G6, the inverters I1, I3 and the flip-flop F3 produce signals L1 and L2; and the inverter I2 and the gate G4 produce a signal IL. The action timing in this circuit is shown in FIG. 6 mentioned previously. In the above circuit configuration, the timing of completion of the fetch cycle is coincident with the timing of completion of the fetch indicating instruction as is obvious from the waveform chart of FIG. 6. This signifies that when the first and second read data storage registers IDR 6-1 and IDR 6-2 are referred to by the fetch indicating instruction, reference is made to the value immediately before execution of the fetch. According to another exemplary method for the timing of completion of the fetch cycle, the fetch is executed synchronously with the beginning of the fetch indicating instruction and, after completion thereof, this instruction is executed. In this case, when the first and second read data storage registers IDRs are referred to by the fetch indicating instruction, it follows that reference is made to the renewed value posterior to the fetch. Although the former case has been mentioned in the above embodiment, it is manifest that the latter case is also included in the scope of the present invention.

Thus, according to the present invention where parallel execution of the memory access and the operational process can be effected under program control, it becomes possible to shorten the required time in processing the data with multiple memory accesses since the operational process is executable during the memory access.

What is claimed is:

1. An operational processor for carrying out a memory access operation to obtain data from a data memory and operational processes in parallel, comprising:
    data operating means for carrying out an arithmetic and logic operation with said data;
    operand data storage means connected to said data operating means for temporarily storing said data to be operated upon by said data operating means;
    data interface mans interposed between said operand data storage means and said data memory;
    instruction interface means for temporarily storing an instruction to be executed; and
    control means connected to said instruction interface means for executing said instruction and controlling said data operating means and said operand data storage means in response to execution of said instruction;
    wherein when a memory read instruction is executed by said control means causing a memory access operation of transferring data from said data memory to said data interface means, said memory access operation is performed in parallel to operational processes of instructions executed subsequent to execution of said memory read instruction; 
    wherein one of said subsequent instructions includes a field which causes said transferring of data from said data interface means to said operand data storage means to be performed as one of said operational processes.

2. An operational processor according to claim 1 wherein: said data interface means includes memory data register means for storing said data read out from said data memory.

3. An operational processor for carrying out a memory access operation to obtain data from a data memory and an operational process in parallel, comprising:
    data operating means for carrying out an arithmetic and logic operation with said data;
    operand data storage means connected to said data operating means for temporarily storing said data to be operated upon by said data operating means;
    data interface means interposed between said operand data storage means and said data memory;
    instruction interface means for temporarily storing an instruction to be executed; and
    control means connected to said instruction interface means for executing said instruction and controlling said data operating means and said operand data storage means in response to execution of said instruction;
    wherein when a memory read instruction is executed by said control means causing a memory access operation of transferring of data from said data memory to said data interface means, said memory access operation is performed in parallel to operational processes of instructions executed subsequent to execution of said memory read instruction;
    wherein one of said subsequent instructions includes a field which causes transferring of data from said data interface means to said operand data storage means to be performed as one of said operational processes;
    said operand data storage means includes at least one input data storage register means, and said memory read instruction includes another field which designates one of said at least one input data storage register means.

4. An operational processor for carrying out a memory access operation to obtain data and operational processes in parallel comprising:
    instruction holding means for holding instructions;
    control means for executing an instruction from said instruction holding means and generating control signals in response to execution of said instruction;
    a data memory for storing data;
    memory data storage means for holding data transferred from said data memory by a memory access operation performed by said control means in response to a control signal from said control means, said control signal being output in response to execution of a memory read instruction;
    operating means for carrying out an arithmetic or logic operational process on said data transferred in response to a control signal from said control means; and
    at least one input data storage means interposed between said memory data storage means and said operating means so as to temporarily hold said read data;
    wherein each of said instructions includes first information to cause an operational process which includes transferring data from said memory data storage means to said input data storage means; and
    wherein said memory access operation is performed in parallel with operational processes of instructions executed subsequent to execution of said memory read instruction.

5. An operational processor for carrying out a memory access operation to obtain data and operational processes in parallel comprising:
    instruction holding means for holding instructions;
    control means for executing an instruction from said instruction holding means and generating control signals in response to execution of said instruction;
    a data memory for storing data;
    memory data storage means for holding data transferred from said data memory by a memory access operation performed by said control means in response to a control signal from said control means, said control singal being output in response to execution of a memory read instruction;
    operating means for carrying out an arithmetic or logic operational process on said transferred data in response to a control signal from said control means; and
    at least one input data storage means interposed between said memory data storage means and said operating means so as to hold said transferred data;
    wherein each of said instructions includes first information to cause an operational process which includes transferring data from said memory data storage means to said input data storage means;

wherein said memory access operation is performed in parallel with operational processes of instructions executed subsequent to execution of said memory read instruction; and wherein each instruction has a field to selectively identify one of said input data storage means, for holding data transferred from said memory data storage means.

6. An operational processor for carrying out a memory access operation to obtain data and operational processes in parallel, comprising:

instruction holding means for holding instructions;

control means for executing an instruction from said instruction holding means and generating control signals in response to execution of said instruction;

a data memory for storing data;

memory data storage means for holding data transferred from said data memory by a memory access operation performed by said control means in response to a control signal from said control means, said control signal being output in response to execution of a memory read instruction;

operating means for carrying out an arithmetic or logic operation process on said data in response to a control signal from said control means; and at least one input data storage means interposed between said memory data storage means and said operating means so as to hold said read data;

wherein each of said instructions includes first information to cause an operational process which includes transferring data read from said memory data storage means to said input data storage means;

wherein said memory access operation is performed in parallel with operational processes of instructions executed subsequent to execution of said memory read instruction; and wherein data in a field of an instruction corresponds to said first information.

7. An operational processor for carrying out a memory access operation to obtain data and operational processes in parallel, comprising:

instruction holding means for holding instructions;

control means for executing an instruction from said instruction holding means and generating control signals in response to said instruction;

a data memory for storing data;

memory data storage mans for holding data transferred from said data memory by a memory access operation performed by said control means in response to a control signal from said control means, said control signal being output in response to execution of a memory read instruction;

operating means for carrying out a n arithmetic or logic operational process on said data in response to a control signal from said control means;

at least one input data storage means interposed between said memory data storage means and said operating means so as to hold said data;

wherein each of said instructions includes first information to cause an operational process which includes transferring data from said memory data storage means to said input data storage means;

wherein said memory access operation is performed in parallel with operational processes of instructions executed subsequent to execution of said memory read instruction; and memory address register means connected to said data memory via an address bus for temporarily storing an address of said data in response to execution of said memory read instruction which is held in said instruction holding means.

8. An operational processor according to claim 7 wherein:

said memory read request instruction has second information for, indicating one of said input data storage means to receive data read from said memory data storage means in response to said first information of another instruction which is one of said instructions subsequently held in said instruction holding means.

9. An operational processor for performing a memory access and execution of instructions in parallel, said operational processor being coupled to instruction memory means for storing instructions and data memory means for storing data, comprising:

memory address register means connected to the data memory means for accessing the data memory means;

memory data register means connected to the data memory means for receiving data from the data memory means;

input data register means connected to said memory data register means for storing data fetched from said memory data register means;

general register means for storing data other than data from said data memory means, said other data being input for use in an operational process;

arithmetic and logic means for receiving the data from said input data register means and said general register means as operand data inputs and performing an arithmetic or logic operational process on said operand data inputs; and control means for controlling instruction execution of said instructions by controlling said memory address, memory data, input data and general register means and said arithmetic and logic means;

wherein determination f an access address corresponding to said data to said memory address register means is performed in response to execution of a memory access request instruction, which is one of said instructions, so as to start a memory access to the data memory means, said accessed data being stored in said memory data register means at the end o said memory access independently from and in parallel to execution of instructions subsequent to execution of said memory access request instruction, wherein fetching of said data from said memory data register means to said input data register means is indicated by information included in one of said subsequent instructions executed in parallel to said memory access, thereby permitting said memory access to be performed in parallel with said execution of said subsequent instructions.

10. An operational processor for performing a memory access and execution of instructions in parallel, said operational processor being coupled to instruction memory means for storing instructions and data memory means for storing data, comprising:

memory address register means connected to the data memory means for accessing the data memory means;

memory data register means connected to the data memory means for receiving data from the data memory means;

input data register means connected to said memory data register means for storing data fetched from said memory data register means;

general register means for storing data other than data from said data memory means, said other data being input for use in an operational process;

arithmetic and logic means for receiving the data from said input data register means and said general register means as operand data inputs and performing an arithmetic or logic operational process on said operand data inputs; and control means for controlling instructions execution of said instructions by controlling said memory address, memory data, input data and general register means and said arithmetic and logic means;

wherein determination of an access address corresponding to said data to said memory address register means is performed in response to execution of a memory access request instruction, which is one of said instructions, so as to start a memory access to the data memory means, said accessed data being stored in said memory data register means at the end of said memory access independently from and in parallel with execution of instructions subsequent to execution of said memory access request instruction, wherein fetching of said data from said memory data register means to said input data register means is indicated by information included in one of said subsequent instructions executed in parallel to said memory access, thereby permitting said memory access to be performed in parallel with said execution of said subsequent instructions; and wherein said information is contained in a field of said one instruction so that said fetching is performed simultaneously with said execution of said subsequent instruction.

11. An operational processor for performing a memory access and execution of instructions in parallel, said operational processor being coupled to instruction memory means for storing instructions and data memory means for storing data, comprising:

memory address register means connected to the data memory means for accessing the data memory means;

memory data register means connected to the data memory means for receiving data from the data memory means;

input data register means connected to said memory data register means for storing data fetched from said memory data register means;

general register means for storing data other than data from said data memory means, said other data being input for use in an operational process;

arithmetic and logic means for receiving the data from said input data register means and said general register means as operand data inputs and performing an arithmetic or logic operational process on said operand data inputs; and control means for controlling instruction execution of said instructions by controlling said memory address, memory data, input data and general register means and said arithmetic and logic means;

wherein determination of an access address corresponding to said data to said memory address register means is performed in response to execution of a memory access request instruction, which is one of said instructions, so as to start a memory access to the data memory means, said accessed data being stored in said memory data register means at the end of said memory access independently from and in parallel to execution of instructions subsequent to execution of said memory access request instruction, wherein fetching of said data from said memory data register means to said input data register means is indicated by information included in one of said subsequent instructions executed in parallel to said memory access, thereby permitting said memory access to be performed in parallel with said execution of said subsequent instructions;

wherein said input data register means includes a plurality of input data registers, and wherein a field of said memory access request instruction includes an indication of one of said input data registers.

12. An operational processor for performing a memory access and an instruction execution, said operational processor being coupled to instruction memory means for storing instructions and data memory for storing data, comprising:

memory address register means connected to the data memory means for accessing the data memory means;

memory data register means connected to the data memory means for receiving data form the data memory means;

input data register means connected to said memory data register means for loading the data from said memory data register means;

arithmetic and logic means for receiving the data from said input data register means as operand data input and performing an operation process on said operand data input; and control means for controlling instruction execution of said instructions by controlling said memory address, memory data and input data register means, and said arithmetic and logic means;

wherein a memory access to the data stored in the data memory means in response to execution of a memory access request instruction, which is one of said instructions, is performed simultaneous with another instruction executed subsequent to execution of said memory access request instruction.

13. An operational processor according to claim 12 wherein:

said loading of the data from said memory data register means to said input data register means is indicated by information included in said another instruction.

14. An operational processor according to claim 12 wherein:

said input data register means includes a plurality of input data registers, and each of said instructions has a field to selectively identify one of said input data registers, for loading the data stored in said memory data register means.

15. An operational processor according to claim 12 wherein said memory address register means holds an address of the data memory means during the execution memory of said request instruction access.

16. An operational processor for carrying out a memory access operation to obtain data from a data memory and operational process independent of each other, comprising:
- data operating means for carrying out an arithmetic and logic operation with said data;
- operand data storage means connected to said data operating means for temporarily storing said data to be operated upon by said data operating means;
- data interface means interposed between said operand data storage means and said data memory;
- instruction interface means for temporarily storing an instruction; and
- control means connected to said instruction interface means executing an instruction from said instruction interface means and controlling said data operating means and said operand data storage means in response to execution of said instruction;
- wherein a reading of data out from said data memory to said data interface means by said control means in response to execution of a memory access request instruction is independently performed relative to operative processes including an operation of transferring data from said data interface mans to said operand data storage means by said control means in response to data in a field of another instruction executed subsequent to execution of said memory access request instruction, said operation of transferring being performed in carrying out an operational process of said another instruction.

17. An operational processor for carrying out a memory access operation with data and operational process independent of each other, comprising:
- instruction holding means for holding instructions;
- control means for executing an instruction from said instruction holding means and generating control signals in response to execution of said instruction;
- a data memory for storing data;
- memory data storage means for holding data read from said data memory by said control means in response to a control signal from said control means output as a result of execution of a memory access instruction;
- operating means for carrying out an arithmetic or logic operational process on said read data in response to a control signal from said control means; and
- at least one input data storage means interposed between said storage means and said operating means so as to hold said read data;
- wherein each of said instructions includes first information to cause transfer of data from said memory data storage means to said input data storage means; and
- wherein said memory access operation of reading data from said data memory in response to execution of said memory access instruction is independently performed relative to an operational process which of transferring data to said input data storage mans, said transferring data to said input data storage means, said transferring being performed in carrying out an operational process of an instruction subsequent to said memory access instruction.

18. An operational processor for performing a memory access and execution of an instruction independent of each other, said operational processor being coupled to instruction memory means for storing instructions and data memory means for storing data, comprising:
- memory address register means connected to the data memory means for accessing the data memory means;
- memory data register means connected to the data memory means for receiving data from the data memory means;
- input data register means connected to said memory data register means for storing data fetched from said memory data register means;
- general register means for storing data other than data from said data memory means, said other data being input for use in an operational process;
- arithmetic and logic means for receiving the data from said input data register means and said general register means as operand data inputs and performing an arithmetic or logic operational process on said operand data inputs; and
- control means for controlling instruction execution of said instructions by controlling said memory address, memory data, input data and general register means and said arithmetic and logic means;
- wherein determination of an access address corresponding to said data to said memory address register means is performed in response to execution of a memory access request instruction, which is one of said instructions so as to start a memory access to the data memory means, said accessed data being stored in said memory data register means at the end of said memory access independently from an instruction executed subsequent to execution of said memory access request instruction, fetching of said data from said memory data register means to said input data register means is indicated by information included in one of said instruction, executed subsequent by the control means.

* * * * *